3,002,593
POWER TRANSMISSION
James B. Black, Rockford, and Conrad R. Hilpert, Winnebago, Ill., assignors to Twin Disc Clutch Company, Racine, Wis., a corporation of Wisconsin
Filed Apr. 2, 1958, Ser. No. 725,952
8 Claims. (Cl. 192—3.2)

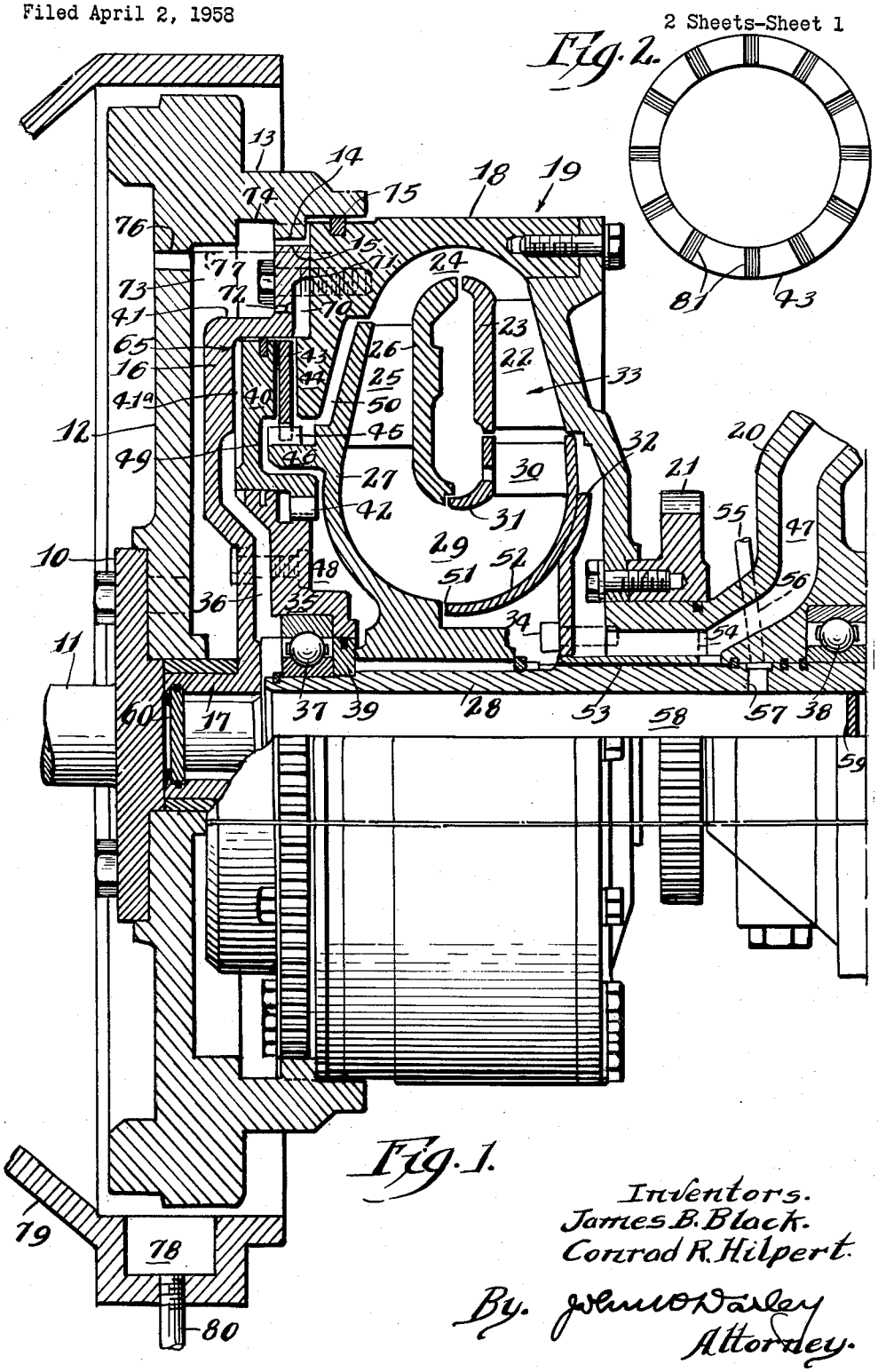

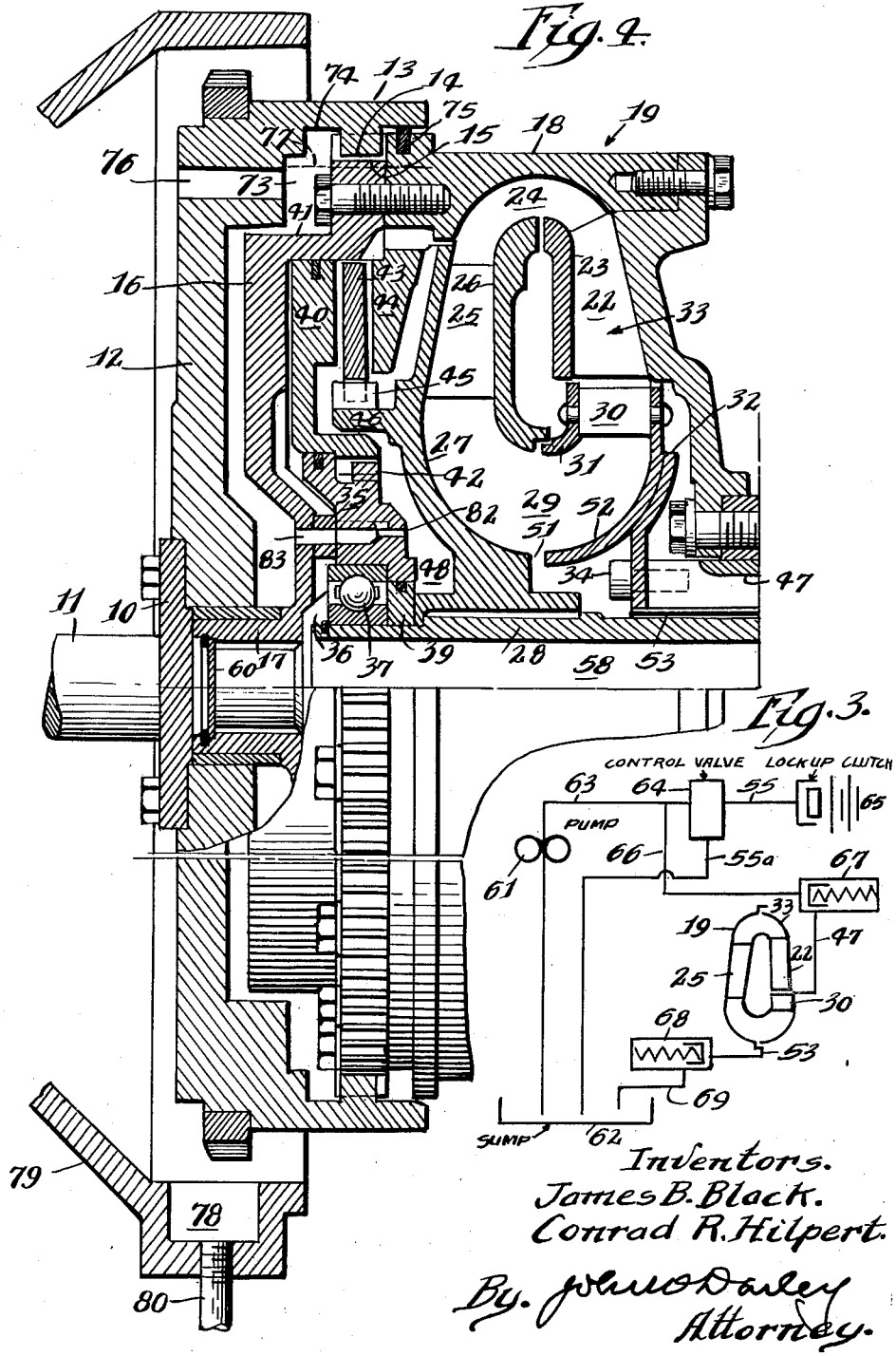

Our invention relates to a power transmission including an hydraulic torque converter of the rotating housing type and is concerned more particularly with an arrangement for lubricating the toothed power driving connection to the rotating housing of the converter.

A common method of providing a driving connection between a power source, such as an engine, and the rotating housing which includes the converter impeller is through meshing gear teeth annuli respectively carried by the engine flywheel, for example, or generally a driving spider or disk, and the housing. While this arrangement provides a positive drive between the parts in question and accommodates reasonable misalignments that may exist between the axes of the flywheel and converter, it is subject to rattle and wear where misalignment occurs due to the relative sliding of the meshing teeth.

It is therefore one object of the invention to provide means for continuously maintaining a submergence of the gear teeth in an oil bath while power is applied to the converter housing.

A further object is to provide an arrangement of the kind indicated wherein the lubricating oil supply is tapped from the working liquid circuit of the converter under controlled conditions.

These and further objects of the invention will be set forth in the following specification, reference being had to the accompanying drawings, and the novel means by which the objects are effectuated will be definitely pointed out in the claims.

In the drawings:

FIG. 1 is an elevation of one form of the transmission, partly in section.

FIG. 2 is an elevation to reduced scale of the lockup clutch driven plate in FIG. 1.

FIG. 3 is a schematic view of the oil circuit employed.

FIG. 4 is a view similar to FIG. 1 showing a modified form of the transmission.

Referring to FIG. 1, the numeral 10 designates a driving member, such as a flange connected to an engine crankshaft 11 and which is bolted to a flywheel 12. The latter is generally indicative of any disk that is connected to a source of power. An annular flange 13 projects from the side of the flywheel opposite to its connection with the crankshaft 11 and is internally toothed at 14 for driving engagement with external teeth 15 annularly provided on an end ring 16 that is coaxial with and carries a hub 17 which extends partially through the flywheel 12.

The ring 16 is bolted to and closes the forward end of a rotating housing 18 forming part of an hydraulic torque converter 19 and the rear end of the housing 18 encircles and has sealing engagement with a stationary carrier 20 and includes a gear 21 for driving a pump that services the converter and a lockup clutch all as presently described. From the foregoing, it will be understood that the ring 16 and housing 18 rotate together under the impulse provided by the flywheel 12.

The housing 18 carries annularly spaced, radial outflow, impeller blades 22 which are bridged therebetween and a core ring 23 and the working liquid, assumed to be a suitable oil in the present instance, discharged by the impeller blades flows through an outer, reversely curved passage 24 for delivery to annularly spaced, radial inflow, turbine blades 25 which are bridged between a core ring 26 and a turbine ring 27 that is keyed to a sleeve output shaft 28 arranged for connection to a suitable load. Oil discharged by the turbine blades 25 flows through an inner, reversely curved passage 29 for delivery to annularly spaced, radial outflow, stator blades 30 positioned at the inlets of the impeller blades 22 and bridged between a core ring 31 and a stator ring 32. The impeller, turbine and stator blades 22, 25 and 30, respectively, and the passages 24 and 29 are related to form a toroidal working circuit generally designated by the numeral 33 and the stator ring 32 is attached to the stationary carrier by pins 34.

On the converter side of the end ring 16, a ring 35 is secured in spaced relation thereto and defines therewith an annular, generally radial passage 36. The ring 35 is journaled on a bearing 37 carried by the adjacent end of the shaft 28 and the latter is journaled in a bearing 38 mounted in the carrier 20. Close to the bearing 37, the inner peripheral surface of the ring 35 has sealing contact with a shouldered portion 39 of the shaft 28 to retain the converter oil at this point, while the outer peripheral surface of the ring 35 has sealing and relative sliding contact with the inner surface of an annular piston 40. The outer surface of the piston 40 has like contact with an annular portion 41 of the end ring 16 which otherwise defines with the piston 40 and ring 35 an annular cylinder 41ª within which the piston is slidable and which cylinder communicates with the passage 36. The inner portion of the piston 40 has toothed sliding connection with the ring 35 as indicated by the numeral 42 so that the piston 40 always rotates with the end ring 16 and hence with the housing 18.

When pressure is applied to the left side of the piston 40 as presently explained, the latter moves to grip an annular, driven, clutch plate 43 against an inwardly extending portion 44 of the housing 18 which is positioned between the turbine ring 27 in the vicinity of the turbine blades 25 and the plate 43. The inner periphery of the clutch plate 43 has toothed sliding connection, as indicated by the numeral 45, with an annular offset 46 provided on the turbine ring 27.

From the above, it will be apparent that, with the clutch plate 43 in the release position shown in FIG. 1 and the engine running, the drive is through the converter 19 with the usual torque multiplication. For direct drive, the piston 40 is pressure moved to engage the plate 43 against the housing portion 44 to thereby cause the turbine ring 27 to rotate at the speed of the housing 18. The piston 40, plate 43 and housing portion 44 together constitute a lockup clutch 65.

Working oil at a determined pressure is continuously supplied to the converter 19 through a passage 47 in the carrier 20 and flows radially outward between the stator ring 32 and the adjacent part of the housing 18 for delivery to the toroidal circuit 33 between the outlets of the stator blades 30 and the inlets of the impeller blades 22. This pressure oil completely fills the toroidal circuit 33 and also the annular chambers 48, 49 and 50 respectively between the turbine ring 27 and the ring 35, piston 40 and housing portion 44, and the turbine ring 27 and housing portion 44. It is this pressure oil which shifts the piston to the release position shown when the engaging pressure for the piston is cut off.

Oil is discharged from the toroidal circuit 33 through an annular opening 51 communicating with the passage 29 and located between the turbine ring 27 and a curved extension 52 connected to the stator ring 32 and forming part of the wall for the passage 29. This discharging oil then flows through an annular passage 53 included between the sleeve shaft 28 and the carrier 20 and thence through a passage 54 in the carrier 20 which is considered to be configured as the passage 47 and offset therefrom in the carrier 20.

Oil pressure for the lockup piston 40 is supplied through a pipe 55 and thence successively through passages 56 and 57 in the carrier 20 and sleeve shaft 23, respectively, the interior of this shaft designated by the numeral 58, and the annular passage 36 to the cylinder 41a. Appropriate barrier members 59 and 60 respectively provided in the sleeve shaft 23 and hub 17 insure the required confinement of the oil moving to the lockup clutch 65.

A suggested schematic relation of the several components in the oil system is shown in FIG. 3 to which reference will now be made, the usual filter and heat exchanger being omitted. A pump 61, driven by the gear 21, draws the oil from a convenient sump 62 and delivers the same through a pipe 63 to a control valve 64 whose pressure outlet side connects through pipe 55 and allied passages (see FIG. 1) with the lockup clutch 65. The control valve 64 is of conventional type in that in one position it determines the application of pressure to the clutch 65 and in another position it denies such pressure so that this clutch is released by the pressure constantly available in the toroidal circuit 33, and the pressure theretofore acting against the piston 40 is relieved to the sump 62 through a pipe 55a.

A pipe 66 connects at one end with the pipe 63 on the inlet side of the control valve 64 and at the opposite end with the inlet of a pressure regulating valve 67 whose outlet connects through the passage 47 (see FIG. 1) with the toroidal circuit 33. The outlet flow from this circuit is then through the passages 53 and 54 (see FIG. 1) to the inlet of a second pressure regulating valve 68 whose outlet connects through passage 69 with the sump 62. By way of example, the regulating valve 67 may be set to establish an engaging pressure of 135 p.s.i. for the lockup clutch 65, while the regulating valve 68 may be set to insure a pressure of 35 p.s.i. in the toroidal circuit 33. Hence, when the control valve 64 is positioned to apply the engaging pressure to the lockup clutch 65, this pressure is sufficiently high to overcome the toroidal circuit pressure of 35 p.s.i. which constantly tends to release the lockup clutch.

The essence of the invention resides in lubricating the driving and driven teeth 14 and 15, respectively, by means of an oil bath in which these teeth are submerged during rotation of the flywheel 12, the oil being tapped from the toroidal circuit 33. With the lockup clutch 65 disengaged as shown in FIG. 1, the oil in the circuit 33, in addition to the principal discharge through the opening 51, also escapes on both sides of the driven clutch plate 43 into a plurality of pockets 70 recessed in and spaced around the radial attaching flange 71 of the ring 16. The oil in these pockets discharges through one or more orifices 72 in the flange 71 to the annular chamber 73 included between the flywheel 12 and ring 16.

Since the flywheel 12 and housing 18 including the ring 16 are rotating, the oil discharged to the chamber 73 is centrifugally thrown outwardly and trapped against the inner surface of the annular flywheel flange 13. On the left side of the driving teeth 14, the flange 13 is annularly recessed at 74 to a diameter slightly in excess of the root diameter of the teeth 14 while on the opposite side of these teeth, the flange 13 is slightly spaced from and is sealably related to the periphery of the housing 18 by means of an annular seal 75 to prevent loss of oil in this locality.

Since the accumulation of too large a mass of oil in the chamber 73 would result in the creation of centrifugal forces that would adversely affect the bearings, the oil is continuously drained from the chamber 73 in such a way that the teeth 14 and 15 are constantly submerged in oil. One or more passages 76, sized in relation to the orifice or orifices 72 to insure the foregoing, extend through the flywheel 12 and are radially positioned so that the inner surface of the oil bath will be maintained just inwardly of the roots of the driven teeth 15 as generally indicated by the line 77. The orifice or orifices 72 are sized to provide a controlled loss of the oil from the toroidal circuit 33 and so that the constant filling of the converter 19 is not disturbed. Oil discharged through the passage or passages 76 is collected in a pocket 78 provided in the lower portion of the usual bell housing 79 for the flywheel 12 and drained to the sump 62 through a pipe 80.

When the lockup clutch 65 is engaged and to insure the oil trapping flow as discussed above, at least the side of the clutch plate 43 which faces the housing portion 44 is provided with a plurality of radial grooves 81 as generally shown in FIG. 2. Similar grooves may also be provided on the opposite side of the clutch plate 43.

In FIG. 4 is shown a modified method of tapping the toroidal circuit 33 to provide lubrication for the teeth 14 and 15. Since the overall structure is identical with that shown in FIG. 1, the same components are identified by like numerals.

Referring to FIG. 4, the orifice or orifices 82, comparable to the similar orifice 72, extends part way through the ring 35 and thence by communicating enlarged passages in the rings 35 and 16 collectively indicated by the numeral 83 to thereby establish a controlled flow connection between the annular chambers 48 and 73. The maintenance of the oil bath in the region of the teeth 14 and 15 then proceeds as discussed above.

While the invention has been specifically described in connection with an hydraulic torque converter, it is also applicable to hydraulic power circuit means generally including hydraulic couplings.

We claim:

1. A power transmission comprising an annular driving member connectible to a source of power, an hydraulic power circuit means axially spaced from and substantially axially aligned with the driving member and including a rotating housing constituting the input thereof and to which working oil is constantly supplied to maintain the filling of the circuit means, the housing being journaled independently of the driving member, concentric meshing teeth respectively provided on the driving member and housing as the sole driving connection, the driving member and housing having portions cooperably related to define an annular chamber for centrifugally trapping oil and into which the respective teeth extend, means for bleeding oil at a controlled rate from the power circuit means for supply to the chamber, and an exhaust passage in the driving member positioned to tap the oil in the chamber at a point close to and radially inwardly of the teeth roots on the housing.

2. A power transmission comprising an hydraulic power circuit means to which working oil is constantly supplied to maintain filling of the same and including an annular, externally toothed, input member axially spaced from and substantially axially aligned with the power circuit means and, an annular driving member having internal teeth meshing with the teeth of the input member as the sole driving connection, the input member being independently journaled relative to the driving member, the input and driving members being cooperably shaped to define an inwardly facing, annular chamber coaxial with the power circuit means and into which the respective teeth extend, an annular seal closing an end of the chamber on one side of the teeth and interposed between the input and driving members, means for bleeding the oil at a controlled rate from the power circuit means for supply to the chamber, and an exhaust passage in the driving member for tapping the oil in the chamber at a point close to and radially inwardly of the teeth roots on the input member.

3. A power transmission as defined in claim 1 wherein the controlled bleeding rate is determined by orifice means in the housing.

4. A power transmission as defined in claim 2 wherein the controlled bleeding rate is determined by orifice means in the input member.

5. A power transmission comprising an hydraulic torque converter including a rotating impeller housing and a turbine related to form a toroidal circuit to which working oil is constantly supplied to maintain filling of the same, a driving member connectible to a source of power and being axially spaced from and substantially axially aligned with the converter, the housing being journaled independently of the driving member, an annular flange projecting laterally from the member in surrounding relation to the adjacent portion of the housing, concentric meshing teeth respectively provided on the flange and housing portion as a sole driving connection, the flange and housing portion being cooperably related to define an annular chamber for centrifugally trapping oil and into which the respective teeth extend, an annular seal closing an end of the chamber on one side of the teeth between the housing and member, means for bleeding oil at a controlled rate from the toroidal circuit for supply to the chamber, and an exhaust passage in the driving member positioned to tap the oil in the chamber at a point close to and radially inwardly of the teeth roots on the housing.

6. A power transmission as defined in claim 5 wherein the controlled bleeding rate is determined by an orifice means in the housing.

7. A power transmission comprising an hydraulic torque converter including an impeller forming part of a rotating housing and a turbine related to constitute a toroidal circuit to which working oil is constantly supplied, a driving member connectible to a source of power, an annular flange projecting laterally from the member in surrounding relation to the adjacent portion of the housing, meshing teeth respectively provided on the flange and housing portion as a driving connection, the flange and housing portion being cooperably shaped to define an annular chamber for centrifugally trapping oil and into which the respective teeth extend, an annular seal closing an end of the chamber on one side of the teeth between the housing and member, a lockup clutch including a driven plate having connection with the turbine and frictionally engageable with a part of the housing to effect a rotation together of the housing and turbine, means for bleeding oil at a controlled rate from the toroidal circuit and directing the same to the chamber including channels in a working face of the driven plate, and an exhaust passage in the driving member positioned to tap the oil at a point close to and radially inwardly of the teeth roots on the housing.

8. A power transmission as defined in claim 7 wherein the controlled bleeding rate is determined by orifice means in the housing.

References Cited in the file of this patent
UNITED STATES PATENTS

| | | |
|---|---|---|
| 2,284,362 | Birmann | May 26, 1942 |
| 2,602,295 | Anderson | July 8, 1952 |
| 2,719,616 | Ahlen | Oct. 4, 1955 |
| 2,731,119 | Burdett et al. | Jan. 17, 1956 |

FOREIGN PATENTS

| | | |
|---|---|---|
| 418,233 | Great Britain | Oct. 22, 1934 |